United States Patent
Yamada

(10) Patent No.: US 7,612,131 B2
(45) Date of Patent: Nov. 3, 2009

(54) FLAME-RETARDANT RESIN COMPOSITION

(75) Inventor: Shinya Yamada, Fuji (JP)

(73) Assignee: Wintech Polymer Ltd., Tokyo (JP)

( * ) Notice: Subject to any disclaimer, the term of this patent is extended or adjusted under 35 U.S.C. 154(b) by 134 days.

(21) Appl. No.: 11/953,914

(22) Filed: Dec. 11, 2007

(65) Prior Publication Data

US 2008/0167406 A1     Jul. 10, 2008

(30) Foreign Application Priority Data

Dec. 21, 2006    (JP)    ............ 2006-343795

(51) Int. Cl.
C08K 5/5313    (2006.01)
H01B 7/00    (2006.01)

(52) U.S. Cl. .............. 524/126; 524/133; 174/110 SR

(58) Field of Classification Search .......... 524/126, 524/133; 174/110 SR
See application file for complete search history.

(56) References Cited

U.S. PATENT DOCUMENTS

2008/0167419 A1 *   7/2008   Eipper et al. ............ 524/539

FOREIGN PATENT DOCUMENTS

| JP | 8-73720 | 3/1996 |
|---|---|---|
| JP | 9-53007 | 2/1997 |
| JP | 2002-30204 | 1/2002 |
| JP | 2002-358837 | 12/2002 |

* cited by examiner

*Primary Examiner*—Peter Szekely
(74) *Attorney, Agent, or Firm*—Nixon & Vanderhye P.C.

(57) ABSTRACT

A flame-retardant resin composition comprises 25 to 150 parts by weight of (B) a thermoplastic polyester1 elastomer, 5 to 40 parts by weight of (C) a phosphinic acid compound comprising a salt of at least one member selected from the group consisting of a phosphinic acid, a diphosphinic acid, and a polymerized product thereof, and 0.5 to 20 parts by weight of (D) an epoxy compound, relative to 100 parts by weight of (A) a polybutylene terephthalate-series resin. Such a flame-retardant resin composition is useful for various molded products and for covering the surface of an electric wire, or the like. The present invention provides a halogen-free flame-retardant resin composition which has a high heat resistance and a high flame retardancy and is excellent in hydrolysis resistance, abrasion resistance, and moldability (e.g., extrusion properties).

10 Claims, No Drawings

FLAME-RETARDANT RESIN COMPOSITION

FIELD OF THE INVENTION

The present invention relates to a flame-retardant resin composition having a high heat resistance and a high flame retardancy without any halogen-containing flame retardant and being excellent in such properties as flexibility, durability (e.g., hydrolysis resistance), and moldability (e.g., extrusion properties). The present invention particularly relates to a flame-retardant resin composition useful for covering (or coating) an electric wire or the like, a process for covering (or coating) an electric wire, and a covered electric wire.

BACKGROUND OF THE INVENTION

In the automobile field, a number of electrical components or parts have been recently used for various purposes, in order to improve fuel efficiency, comfortable ride, safety, and others. Those purposes include many things, for example, various electronic control equipments or sensors of combustion or running represented by ECU (Electrical Control Unit), interior or exterior lighting associated equipments, air-conditioning equipments, and motor-driven equipments (such as windshield wipers or power windows). Along with an increase of electrical components, the number of wires in an automobile also increases for the purpose of transmission of an electric power or a controlling signal to activate those electrical components. Such a material employed in wiring (e.g., a covering material for wire) requires a high durability or a high flame retardancy.

So far a polyvinyl chloride resin has been used as a material excellent in durability or flame retardancy. In the light of flame retardancy, it has been known that a halogen-containing flame retardant can impart a high-level flame retardancy to a resin or the like. However, from the viewpoint of the burden on the environment, a halogen-free material, for example, a material containing a flame-retardant polyolefin, a flame-retardant polyester elastomer, or the like as a main or base component (particularly, a material that does not contain any halogen-containing flame retardant) is attracting attention.

As such a material, for example, Japanese Patent Application Laid-Open No. 53007/1997 (JP-9-53007A, Claims 1 and 2) discloses a flame-retardant resin composition that comprises (A) a polyester block copolymer and (C) a phosphorus compound and/or a triazine compound and if necessary (B) a polyalkylene terephthalate resin in a proportion of 5 to 150 parts by weight of the compound (C) relative to 100 parts by weight of the total amount of the polyester block copolymer (A) and the polyalkylene terephthalate resin (B). In the resin composition, the polyester block copolymer (A) comprises a polybutylene terephthalate as a hard segment and a polyester as a soft segment, and the polyester comprises an aromatic dicarboxylic acid and a long-chain diol having a carbon number of 5 to 12 as main units. In addition, the document discloses an electric wire that has an electric conductor covered the outside with the resin composition as a covering material. Moreover, Japanese Patent Application Laid-Open No. 30204/2002 (JP-2002-30204A, Claims 1 and 12) discloses that the following flame-retardant polyester elastomer resin composition is suitable for covering of an electric wire or an optical fiber: the resin composition comprises 100 parts by weight of (A) a polyether ester block copolymer comprising (a) a high-melting point crystalline polymer segment containing a crystalline aromatic polyester unit and (b) a low-melting point polymer segment containing an aliphatic polyether unit as main units, 1 to 50 parts by weight of (B) a phosphorus-containing compound, and 0.01 to 10 parts by weight of (C) a monocarbodiimide compound and/or (D) a polycarbodiimide compound.

However, such resin compositions have a low hydrolysis resistance. In addition, those compositions require a large amount of a flame retardant in order to improve the flame retardancy, so that the properties of the resin are significantly deteriorated. Moreover, the use of a phosphate ester compound as the phosphorus compound has some problems such as deterioration in external appearance and electric properties caused by bleeding out (blooming) derived from the phosphate ester compound (e.g., deterioration in volume resistance) and deterioration in heat resistance. Therefore, a material having properties necessary for a wide range of uses in the automobile field (for example, toughness, heat resistance, hydrolysis resistance, and burning resistance) has been required.

Moreover, Japanese Patent Application Laid-Open No. 358837/2002 (JP-2002-358837A, Claims 1 and 4 to 6) discloses a flat cable having an insulating covering (or coating) that comprises the following polyester resin composition: the resin composition comprises 100 parts by weight of (A) a thermoplastic aromatic polyester, 10 to 120 parts by weight of (B) a polyester block copolymer containing a polytetramethylene terephthalate as a hard segment and a polyester containing an aromatic dicarboxylic acid and a long-chain diol having a carbon number of 5 to 12 as a soft segment, and 1 to 50 parts by weight of (C) an olefin-acrylate copolymer modified with a glycidyl compound. This document also discloses that the resin composition may contain a phosphorus-containing flame retardant or a polycarbodiimide compound. However, such a resin composition lacks abrasion resistance or enough flame retardancy.

On the other hand, Japanese Patent Application Laid-Open No. 73720/1996 (JP-8-73720A, Claim 1) discloses a method for using a specific calcium or aluminum phosphinate for a polyester resin. While the salt can impart a flame retardancy to the resin, such a resin composition is insufficient in flexibility or toughness. Therefore, the resin composition is not suitable for a covering (or a coating) of an electric wire.

SUMMARY OF THE INVENTION

It is therefore an object of the present invention to provide a flame-retardant resin composition having a high flame retardancy and being excellent in workability (or processability) and flexibility or toughness.

It is another object of the present invention to provide a flame-retardant resin composition that has suitable adhesiveness to a conductor (an electric wire), is excellent in durability, heat resistance, and extrusion workability, and is suitable for a covering of an electric wire; an electric wire covered (or coated) with the flame-retardant resin composition (a covered electric wire); and a process for covering (or coating) an electric wire.

It is still another object of the present invention to provide a flame-retardant resin composition in which bleeding out is inhibited even under a high-temperature environment and excellent properties can be maintained.

The inventor of the present invention made intensive studies to achieve the above objects and finally found that a combination of four specific components provides a resin composition having a high f lame retardancy even in a halogen-free system, being excellent in moldability (such as extrusion workability) and flexibility or toughness, and being suitable for a covering (or a coating) of an electric wire. The present invention was accomplished based on the above findings.

That is, the flame-retardant resin composition of the present invention comprises (A) a polybutylene terephthalate-series resin, (B) a thermoplastic polyester elastomer, (C) a phosphinic acid compound comprising a salt of at least one member selected from the group consisting of a phosphinic acid, a diphosphinic acid, and a polymerized product thereof (a polymerized product of a phosphinic acid and/or a diphosphinic acid), and (D) an epoxy compound. The polyester elastomer (B) may comprise a block copolymer of (b-1) a polyalkylene arylate hard block and (b-2) a polyester soft block. Regarding the phosphinic acid compound (C), the salt of a phosphinic acid (or the phosphinic salt) may be a compound represented by the following formula (1), and the salt of a diphosphinic acid (or the diphosphinic salt) may be a compound represented by the following formula (2):

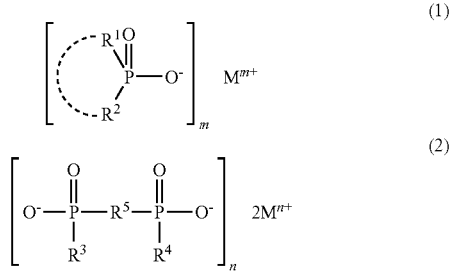

wherein $R^1$, $R^2$, $R^3$, and $R^4$ are the same or different and each represents an alkyl group, a cycloalkyl group, an aryl group, or an aralkyl group, and $R^5$ represents an alkylene group, an alicyclic bivalent group, or an aromatic bivalent group; $R^1$ and $R^2$ may bond together to form a ring with an adjacent phosphorus atom; $M^{m+}$ represents a metal having m-valences, and "m" denotes an integer of 2 to 4; $M^{n+}$ represents a metal having n-valences, and "n" denotes an integer of 2 to 4. The salt of a phosphinic acid and the salt of a diphosphinic acid may be metal salts, and the metal constituting the metal salts may be an alkaline earth metal or a metal of the group 13 of the Periodic Table of Elements.

The epoxy compound (D) may comprise at least one member selected from the group consisting of (d-1) an epoxy resin and (d-2) a vinyl-series copolymer having a glycidyl group. The resin composition may comprise 25 to 150 parts by weight of the polyester elastomer (B), 5 to 40 parts by weight of the phosphinic acid compound (C), and 0.5 to 20 parts by weight of the epoxy compound (D), relative to 100 parts by weight of the polybutylene terephthalate-series resin (A).

In the preferred resin composition, the polybutylene terephthalate-series resin (A) may have an intrinsic viscosity of 0.8 to 1.3 dL/g, the polyester elastomer (B) may be a block copolymer of (b-1) a polybutylene terephthalate hard block and (b-2) a polyester soft block having at least one unit selected from the group consisting of a polyether unit and an aliphatic polyester unit, and the epoxy compound (D) may comprise at least one member selected from the group consisting of (d-1) an aromatic epoxy resin having an epoxy equivalent of 250 to 1200 g/eq and (d-2) a copolymer of a vinyl-series monomer having a glycidyl group and a copolymerizable monomer having an α,β-unsaturated bond.

The present invention also includes a covered (or coated) electric wire, which comprises an electric wire whose surface is covered with the flame-retardant resin composition. Further, the present invention includes a process for covering an electric wire, which comprises covering a surface of an electric wire with the flame-retardant resin composition. In the process, the surface of an electric wire may be covered with the use of an extrusion molding or a press processing.

DETAILED DESCRIPTION OF THE INVENTION

The flame-retardant resin composition of the present invention comprises four specific components, that is, (A) a polybutylene terephthalate-series resin, (B) a thermoplastic polyester elastomer, (C) a phosphinic acid compound, and (D) an epoxy compound.

(A) Polybutylene Terephthalate (PBT)-Series Resin

The PBT-series resin as a base resin may include a homopolyester or a copolyester containing a butylene terephthalate unit as a main unit (for example, in a proportion of about 50 to 100% by weight, preferably about 60 to 100% by weight, and more preferably about 70 to 100% by weight), for example, a polybutylene terephthalate and a polybutylene terephthalate copolyester.

A copolymerizable monomer (or a comonomer) in the copolyester (a butylene terephthalate-series copolymer or a modified PBT resin) may include a dicarboxylic acid other than terephthalic acid, a diol other than 1,4-butanediol, a hydroxycarboxylic acid, a lactone, and others. The copolymerizable monomers may be used singly or in combination.

The dicarboxylic acid may include, for example, an aliphatic dicarboxylic acid (e.g., a $C_{4-40}$ aliphatic dicarboxylic acid such as succinic acid, glutaric acid, adipic acid, pimelic acid, suberic acid, azelaic acid, sebacic acid, undecanedicarboxylic acid, dodecanedicarboxylic acid, hexadecanedicarboxylic acid, or dimeric acid, preferably a $C_{4-14}$dicarboxylic acid), an alicyclic dicarboxylic acid (e.g., a $C_{8-12}$ alicyclic dicarboxylic acid such as hexahydrophthalic acid, hexahydroisophthalic acid, hexahydroterephthalic acid, or himic acid), an aromatic dicarboxylic acid other than terephthalic acid (e.g., a $C_{8-16}$ aromatic dicarboxylic acid such as phthalic acid, isophthalic acid; a naphthalenedicarboxylic acid such as 2,6-naphthalenedicarboxylic acid; and 4,4'-diphenyldicarboxylic acid, 4,4'-diphenoxyetherdicarboxylic acid, 4,4'-diphenyletherdicarboxylic acid, 4,4'-diphenylmethanedicarboxylic acid, or 4,4'-diphenylketonedicarboxylic acid), or a reactive derivative thereof [for example, a derivative capable of forming an ester (or an ester-formable derivative), e.g., a lower alkyl ester (e.g., a $C_{1-4}$alkyl ester of phthalic acid or isophthalic acid, such as dimethyl phthalate or dimethyl isophthalate (DMI)); an acid chloride; an acid anhydride; and a derivative capable of forming an ester (or an ester-formable derivative), such as an alkyl-, alkoxy-, or halogen-substituted compound of the dicarboxylic acid].

The diol may include, for example, an aliphatic alkylene glycol other than 1,4-butanediol (for example, a lower alkylene glycol such as ethylene glycol, trimethylene glycol, propylene glycol, neopentyl glycol, hexanediol (e.g., 1,6-hexanediol), octanediol (e.g., 1,3-octanediol), or decanediol (e.g., a $C_{2-12}$alkylene glycol, preferably a $C_{2-10}$alkylene glycol), a polyoxyalkylene glycol [for example, a glycol having a plurality of oxy $C_{2-4}$alkylene units, e.g., diethyleneglycol, dipropylene glycol, ditetramethylene glycol, triethylene glycol, tripropylene glycol, and a polytetramethylene glycol], an alicyclic diol (e.g., 1,4-cyclohexanediol, 1,4-cyclohexanedimethanol, and a hydrogenated bisphenol A), an aromaticdiol [for example, a $C_{6-14}$aromatic diol such as hydroquinone, resorcinol, or naphthalenediol; a biphenol (e.g., 4,4'-dihydroxybiphenyl); a bisphenol compound; and xylylene glycol], and a reactive derivative thereof (e.g., a derivative capable of forming an ester, such as an alkyl-, alkoxy-, or halogen-substituted compound of the diol).

The bisphenol compound may include a bis(hydroxyaryl) $C_{1-6}$alkane such as bis(4-hydroxyphenyl)methane (bisphenol F), 1,1-bis(4-hydroxyphenyl)ethane (bisphenol AD), 1,1-bis (4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl) hexane, or 2,2-bis(4-hydroxyphenyl)-4-methylpentane; a bis (hydroxyaryl)$C_{4-10}$cycloalkane such as 1,1-bis(4-hydroxyphenyl)cyclopentane or 1,1-bis(4-hydroxyphenyl) cyclohexane; 4,4'-dihydroxydiphenyl ether; 4,4-dihydroxydiphenyl sulfone; 4,4'-dihydroxydiphenyl sulfide; 4,4'-dihydroxydiphenyl ketone; and an alkylene oxide adduct thereof. The alkylene oxide adduct may include a $C_{2-3}$alkylene oxide adduct of a bisphenol compound (for example, bisphenol A, bisphenol AD, and bisphenol F), e.g., 2,2-bis-[4-(2-hydroxyethoxy)phenyl]propane, diethoxylated bisphenol A (EBPA), 2,2-bis-[4-(2-hydroxypropoxy)phenyl]propane, and dipropoxylated bisphenol A. In the alkylene oxide adduct, the mole number of the added alkylene oxide (a $C_{2-3}$alkylene oxide such as ethylene oxide or propylene oxide) may be about 1 to 10 mol and preferably about 1 to 5 mol, relative to each hydroxyl group.

The hydroxycarboxylic acid may include, for example, a hydroxycarboxylic acid such as hydroxybenzoic acid, hydroxynaphthoic acid, hydroxyphenylacetic acid, 4-carboxy-4'-hydroxy-biphenyl, glycolic acid, or hydroxycaproic acid, or a derivative thereof (e.g., an alkyl-, alkoxy-, or halogen-substituted compound), and others. The lactone may include a $C_{3-12}$lactone such as propiolactone, butyrolactone, valerolactone, or caprolactone (e.g., ε-caprolactone), and others.

If necessary, these copolymerizable monomers may be used in combination with a polyfunctional compound, for example, a polycarboxylic acid (such as trimesic acid, trimellitic acid, or pyromellitic acid) or a derivative thereof capable of forming an ester (e.g., an alcohol ester), and a polyol (such as glycerin, trimethylolpropane, trimethylolethane, or pentaerythritol) or a derivative thereof capable of forming an ester. The combination use of such a polyfunctional compound allows a branched PBT-series resin.

The preferred copolymerizable monomer includes a diol [for example, a $C_{2-6}$alkylene glycol (e.g., a straight chain or branched chain alkylene glycol such as ethylene glycol, trimethylene glycol, propylene glycol, or hexanediol), a polyoxy$C_{2-4}$alkylene glycol having a repeating oxyalkylene unit of about 2 to 4 (e.g., diethylene glycol), and a bisphenol compound (e.g., a bisphenol compound or an alkylene oxide adduct thereof)], a dicarboxylic acid [for example, a $C_{6-12}$aliphatic dicarboxylic acid (e.g., adipic acid, pimelic acid, suberic acid, azelaic acid, and sebacic acid), an asymmetrical aromatic dicarboxylic acid having two carboxyl groups at asymmetric positions of an arene ring thereof, and 1,4-cyclohexanedimethanol], and others. Among these compounds, the preferred one includes an aromatic compound, for example, an alkylene oxide adduct of a bisphenol compound (particularly, bisphenol A) and an asymmetrical aromatic dicarboxylic acid [for example, phthalic acid, isophthalic acid, and a reactive derivative thereof (e.g., a lower alkyl ester such as dimethyl isophthalate (DMI))], and others.

As the PBT-series resin, a PBT-series resin having a copolymerizable monomer unit in a proportion (amount) of not more than 30 mol % (0 to 30 mol %) (a homopolyester (a polybutylene terephthalate) and/or a copolyester (a copolymer) is preferred. In the copolymer, the proportion of the copolymerizable monomer unit may be selected from the range of, for example, about 0.01 to 30 mol %. The proportion may be usually about 1 to 30 mol %, preferably about 3 to 25 mol %, and more preferably about 5 to 20 mol % (e.g., about 5 to 15 mol %). The PBT-series resins may be used singly or in combination.

The intrinsic viscosity (IV) of the PBT-series resin is not particularly limited to a specific one. For example, the intrinsic viscosity (IV) of the PBT-series resin may be about 0.6 to 1.4 dL/g when measured in o-chlorophenol at 35° C. In the light of hydrolysis resistance or extrusion workability, the above-mentioned intrinsic viscosity may be preferably about 0.8 to 1.3 dL/g and more preferably about 0.85 to 1.2 dL/g. In the case of too low an intrinsic viscosity, sometimes a desired hydrolysis resistance or a desired extrusion workability (melt tension) cannot be obtained. Moreover, in the case of too high an intrinsic viscosity, there is a possibility that an applied load is increased in an extrusion process.

The PBT-series resin may be produced by copolymerizing (polycondensing) terephthalic acid or a reactive derivative thereof and 1,4-butanediol and if necessary, a copolymerizable monomer with a conventional manner, for example, transesterification, direct esterification, and others.

(B) Thermoplastic Polyester Elastomer

The thermoplastic polyester elastomer usually comprises a block copolymer having a structure in which a polyester hard block (a hard block or a hard segment, such as an aromatic polyester) bonds with a polyester soft block (a soft block or a soft segment) through an ester bond. The thermoplastic polyester elastomer can be divided into two classes, a polyether-based one and a polyester-based one, according to the kind of the soft block. Either of these elastomers may be used in the present invention.

A hard polyester constituting the hard block may be obtained, in the same manner as in the PBT-series resin, by a polycondensation of a dicarboxylic acid and a diol, a polycondensation of a hydroxycarboxylic acid, and others. An aromatic polyester obtained from at least an aromatic monomer component may be usually employed. The aromatic monomer component may include, for example, an aromatic diol and a reactive derivative thereof as exemplified in the paragraph of the PBT-series resin, an aromatic dicarboxylic acid and terephthalic acid (and a reactive derivative of such an aromatic dicarboxylic acid) as exemplified in the paragraph of the PBT-series resin, and/or an aromatic hydroxycarboxylic, acid [for example, hydroxybenzoic acid, hydroxynaphthoic acid, 4-carboxy-4'-hydroxy-biphenyl, and a derivative of such a hydroxycarboxylic acid (e.g., an alkyl-, alkoxy-, or halogen-substituted compound)]. The aromatic monomer components may be used singly or in combination. In the aromatic polyester, if necessary, a copolymerizable monomer (including a copolymerizable monomer as exemplified in the paragraph of the PBT-series resin, and in addition, 1,4-butanediol, terephthalic acid, and others) may be used in combination.

It is sufficient for the aromatic polyester to use at least the aromatic monomer component as a monomer component. For example, the aromatic polyester may be a fully aromatic polyester (e.g., a polyester of an aromatic dicarboxylic acid and an aromatic diol, and a polyester of an aromatic hydroxycarboxylic acid) or may be a polyester of an aromatic dicarboxylic acid and a non-aromatic diol (e.g., 1,4-butanediol, and an aliphatic diol or an alicyclic diol as exemplified in the paragraph of the PBT-series resin), a polyester of a non-aromatic dicarboxylic acid (e.g., an aliphatic dicarboxylic acid as exemplified in the paragraph of the PBT-series resin) and an aromatic diol, and a polyester of an aromatic hydroxycarboxylic acid and a non-aromatic hydroxycarboxylic acid (e.g., an aliphatic hydroxycarboxylic acid such as glycolic acid or hydroxycaproic acid).

Among these hard polyesters, the preferred one includes a crystalline aromatic polyester [for example, a polyalkylene arylate (e.g., a poly$C_{2-4}$alkylene arylate such as a polyethylene terephthalate, a polybutylene terephthalate, a polyethylene naphthalate, or a polybutylene naphthalate, and a modified poly$C_{2-4}$alkylene arylate (e.g., a poly$C_{2-4}$alkylene arylate modified or copolymerized with 1 to 30 mol % (e.g., about 3 to 25 mol % and preferably about 5 to 20 mol %) of a copolymerizable component (the above-mentioned copolymerizable monomer such as isophthalic acid)))] and a liquid crystal polyester, particularly, a polybutylene terephthalate or the like.

A soft polyester constituting the soft block of the polyester-based elastomer may be obtained, in the same manner as in the PET-series resin, by a polycondensation of a dicarboxylic acid and a diol, a polycondensation of a hydroxycarboxylic acid or a lactone, and others. It is sufficient that the soft polyester is softer than the hard polyester constituting the hard block. Examples of the soft polyester includes, usually, a polyester obtained from at least an aliphatic monomer component [for example, an aliphatic diol (e.g., 1,4-butanediol, and an aliphatic diol and a reactive derivative thereof as exemplified in the paragraph of the PBT-series resin), an aliphatic dicarboxylic acid (e.g., an aliphatic dicarboxylic acid and a reactive derivative thereof as exemplified in the paragraph of the PET-series resin), an aliphatic hydroxycarboxylic acid (e.g., glycolic acid and hydroxycaproic acid), and a lactone as exemplified in the paragraph of the PBT-series resin]. If necessary, the aliphatic monomer component may be used in combination with a copolymerizable monomer (usually, a non-aromatic monomer component, e.g., an alicyclic diol or an alicyclic dicarboxylic acid and a reactive derivative thereof as exemplified in the paragraph of the PBT-series resin).

Among these soft polyesters, an amorphous polyester, for example, an aliphatic polyester of an aliphatic dicarboxylic acid and an aliphatic diol, and a polylactone (a ring-opening polymer of the lactone) are preferred.

It is sufficient that the soft segment of the polyether-based elastomer has at least a polyether unit. The soft segment may comprise a polyether [for example, an aliphatic polyether having a polyoxyalkylene unit (e.g., a polyoxyalkylene glycol as exemplified in the paragraph of the PBT-series resin, preferably a poly$C_{2-6}$alkylene glycol)] or a polyester obtained by using the polyether. Among these polyethers, a poly$C_{2-4}$alkylene glycol such as a polyoxyethylene glycol, a polyoxypropylene glycol, or a polyoxytetramethylene glycol is preferred. The polyester obtained by using the polyether may include a polyester of the polyether (e.g., a polyoxyalkylene glycol) and a dicarboxylic acid [usually, a non-aromatic dicarboxylic acid, e.g., an aliphatic or an alicyclic dicarboxylic acid and a reactive derivative thereof as exemplified in the paragraph of the PBT-series resin], and others.

Among these soft blocks, a polyester soft block having at least one unit selected from the group consisting of a polyether unit (an aliphatic polyether unit, a polyester unit obtained by using an aliphatic polyether) and an aliphatic polyester unit is preferred.

Concrete examples of the thermoplastic polyester elastomer (B) include a polyester-based (that is, a polyester-polyester-based) thermoplastic elastomer and a polyether-based (that is, a polyester-polyether-based) thermoplastic elastomer. The polyester-based elastomer includes, for example, a block copolymer of a hard segment that comprises an aromatic crystalline polyester [e.g., a poly$C_{2-4}$alkylene arylate (particularly, a homopolymer having a polybutylene terephthalate unit or a copolymer having a copolymerizable component (such as ethylene glycol or isophthalic acid)) or a liquid crystal polyester] and a soft segment that comprises an aliphatic polyester [e.g., a polyester of a $C_{2-6}$alkylene glycol (such as a polyethylene adipate or a polybutylene adipate) and a $C_{6-12}$alkanedicarboxylic acid]. The polyether-based elastomer includes, for example, a block copolymer of a hard segment that comprises the aromatic crystalline polyester or the liquid crystal polyester and a soft segment that comprises a polyether such as a polyoxy$C_{2-4}$alkylene glycol such as a polytetramethyleneether glycol (e.g., a polyester of a polyoxyalkylene glycol and a dicarboxylic acid).

Among the polyester elastomers (B), the preferred one includes a block copolymer of (b-1) a polyalkylene arylate hard block and (b-2) a polyester soft block that comprises a polycaprolactone, an aliphatic polyether having an oxy$C_{2-6}$alkylene unit (e.g., a poly$C_{2-6}$alkylene glycol), or an aliphatic polyester. The thermoplastic polyester elastomers (B) may be used singly or in combination.

In the thermoplastic elastomer, the weight ratio of the hard segment (or hard component) relative to the soft segment (or soft component) [the former/the latter] is usually about 10/90 to 90/10, preferably about 20/80 to 80/20, and more preferably about 30/70 to 70/30 (for example, about 40/60 to 60/40).

In the purpose that requires flexibility (e.g., an electric wire covering), for example, the flexural modulus of the thermoplastic polyester elastomer (B) is preferably in the range of not more than 1000 MPa, and preferably about 50 to 400 MPa (particularly, about 100 to 300 MPa). In such a purpose, too small a flexural modulus causes some problems in the handling of the process. On the other hand, in the case of too a large flexural modulus, there is a possibility that enough flexibility cannot be obtained.

(C) Phosphinic Acid Compound

The phosphinic acid compound may include, for example, a salt of a phosphinic acid, a diphosphinic acids and/or a polymerized product thereof (or a condensate, e.g., a polyphosphinic acid) [for example, a metal salt; a salt with at least one salt-forming (or a salifiable) component selected from the group consisting of boron, ammonium, and a basic nitrogen-containing compound (e.g., a metal salt, a boron salt (such as a boryl compound), an ammonium salt, a salt with an amino group-containing nitrogen-containing compound)]. The phosphinic acid compounds may be used singly or in combination. Incidentally, the phosphinic acid compound may have either a chain structure or a cyclic structure.

The phosphinic acid, the diphosphinic acid, or the polymerized product thereof, which forms a salt, may be a phosphinic acid free from an organic group or a diphosphinic acid free from an organic group, and usually, is an organic phosphinic acid, an organic diphosphinic acid, a polymer (or a condensate) of an organic diphosphinic acid, or others in practical cases. The salt may contain such a phosphinic acid singly or in combination.

Among the above-mentioned phosphinic acid compounds, a metal salt is particularly preferred. The metal that forms a salt may include an alkali metal (e.g., potassium and sodium), an alkaline earth metal (e.g., magnesium and calcium), a transition metal (e.g., iron, cobalt, nickel, and copper), a metal of the group 12 of the Periodic Table of Elements (e.g., zinc), a metal of the group 13 of the Periodic Table of Elements (e.g., aluminum) and others. The metal salts may contain one of these metals or not more than two thereof. Among the above-mentioned metals, an alkaline earth metal (e.g., calcium) and a metal of the group 13 of the Periodic Table of Elements (e.g., aluminum) are preferred.

The valence of the metal is not particularly limited to a specific one. The valence may be about 1 to 4, preferably about 2 to 4, and more preferably 2 or 3.

Concrete examples of the metal salt of the phosphinic acid (or the phosphinic acid metal salt) include a compound represented by the following formula (1). Concrete examples of the metal salt of the diphosphinic acid (or the diphosphinic acid metal salt) include a compound represented by the following formula (2).

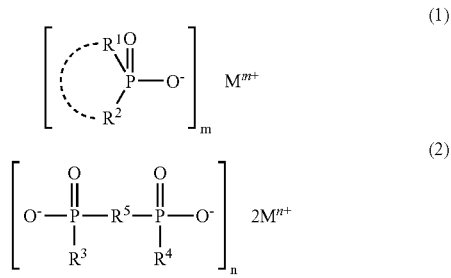

In the formula, $R^1$, $R^2$, $R^3$, and $R^4$ are the same or different and each represents a hydrocarbon group, and $R^5$ represents a bivalent hydrocarbon group. The groups $R^1$ and $R^2$ may bond together to form a ring with an adjacent phosphorus atom. The group $M^{m+}$ represents the above-mentioned metal having m-valences, and "m" denotes an integer of 2 to 4. The group $M^{n+}$ represents the above-mentioned metal having n-valences, and "n" denotes an integer of 2 to 4.

The hydrocarbon group represented by each of groups, $R^1$, $R^2$, $R^3$, and $R^4$, may include an alkyl group (e.g., a straight chain or branched chain $C_{1-6}$alkyl group such as methyl, ethyl, isopropyl, n-butyl, or t-butyl group), a cycloalkyl group (e.g., a $C_{5-8}$cycloalkyl group such as cyclohexyl group), an aryl group (e.g., a $C_{6-10}$aryl group such as phenyl group), an aralkyl group (e.g., a $C_{6-10}$aryl-$C_{1-4}$alkyl group such as benzyl group), and others. Among these groups, the preferred one usually includes an alkyl group (e.g., preferably a $C_{1-4}$alkyl group) and an aryl group (e.g., phenyl group).

The ring, which is formed by bonding the groups $R^1$ and $R^2$ together with an adjacent phosphorus atom, is a heterocycle (or a heterocyclic ring) having the phosphorus atom as a hetero atom constituting the ring (that is, a phosphorus atom-containing heterocycle). The ring may usually include a 4- to 20-membered heterocycle and preferably a 5- to 16-membered heterocycle. Moreover, the phosphorus atom-containing heterocycle may be a bicyclo ring. The phosphorus atom-containing heterocycle may have a substituent.

The bivalent hydrocarbon group represented by the group $R^5$ may include an alkylene group (or an alkylidene group, e.g., a straight chain or branched chain $C_{1-10}$alkylene group that may have a substituent (e.g., a $C_{6-10}$aryl group), such as methylene, ethylene, phenylethylene, propylene, trimethylene, 1,4-butanediyl, or 1,3-butanediyl group), an alicyclic bivalent group (e.g., a $C_{5-8}$alicyclic bivalent group such as cyclohexylene group or cyclohexanedimethylene group), an aromatic bivalent group [for example, a $C_{6-10}$arylene group that may have a substituent (e.g., a $C_{1-4}$alkyl group), such as phenylene group or tolylene group; a $C_{6-10}$arenedi$C_{1-4}$alkylene group that may have a $C_{1-4}$alkyl group (e.g., methyl group) on an arene ring thereof, such as xylylene group; and a bisaryl group that may have a $C_{1-4}$alkyl group (e.g., methyl group) on an arene ring thereof (e.g., biphenylene group; a straight chain or branched chain $C_{1-4}$alkane-di$C_{6-10}$arylene group such as methanediphenylene group; a bivalent group corresponding to a di$C_{6-10}$aryl ether such as diphenyl ether; a bivalent group corresponding to a di$C_{6-10}$aryl ketone such as diphenyl ketone; and a bivalent group corresponding to a di$C_{6-10}$aryl sulfide such as diphenyl sulfide)], and others. Among these bivalent hydrocarbon groups, the preferred one includes an alkylene group (e.g., particularly a $C_{1-6}$alkylene group).

The preferred metal salts (1) and (2) include a polyvalent metal salts having the valences ("m" and "n") of 2 to 3, respectively. Concrete examples of the phosphinic acid metal salt (1) include a calcium dialkylphosphinate such as calcium dimethylphosphinate, calcium methylethylphosphinate, or calcium diethylphosphinate (e.g., a calcium di$C_{1-10}$alkylphosphinate); a calcium arylphosphinate such as calcium phenylphosphinate or calcium diphenylphosphinate (e.g., a calcium mono- or di$C_{6-10}$arylphosphinate); a calcium alkylarylphosphinate such as calcium methylphenylphosphinate (e.g., a calcium $C_{1-4}$alkyl-$C_{6-10}$aryl-phosphinate); a calcium salt of an alkylenephosphinic acid that may have a substituent, such as a calcium salt of 1-hydroxy-1H-phosphorane-1-oxide or a calcium salt of 2-carboxy-1-hydroxy-1H-phosphorane-1-oxide (e.g., a calcium $C_{3-8}$alkylenephosphinate); an aluminum salt corresponding to such a calcium salt; other metal salt; and others.

Concrete examples of the diphosphinic acid metal salt (2) include a calcium alkanebisphosphinate such as calcium ethane-1,2-bis(phosphinate) [e.g., a calcium $C_{1-10}$alkanebis(phosphinate)]; a calcium alkanebis(alkylphosphinate) such as calcium ethane-1,2-bis(methylphosphinate) [e.g., a calcium $C_{1-10}$alkanebis($C_{1-6}$alkylphosphinate)]; an aluminum salt corresponding to such a calcium salt; and other metal salt; and others.

The phosphinic acid metal salt (B) may also include a polymer (or a condensate) of such a polyvalent metal salt of a phosphinic acid and/or such a polyvalent metal salt of a diphosphinic acid.

The phosphinic acid compound preferably includes at least one member selected from the group consisting of a polyvalent metal salt of a phosphinic acid, a polyvalent metal salt of a diphosphinic acid, and a polyvalent metal salt of a polymer (or a condensate) of a diphosphinic acid.

The preferred phosphinic acid compound particularly includes a metal salt of a dialkylphosphinic acid (e.g., a calcium salt and an aluminum salt) and a metal salt of an alkanebisphosphinic acid (e.g., a calcium salt and an aluminum salt) among the metal salts represented by the above-mentioned formula (1) or (2).

The proportion of the phosphinic acid compound relative to 100 parts by weight of the polyester-series resin (A) may be, for example, selected from the range of about 5 to 60 parts by weight. The proportion is preferably about 10 to 50 parts by weight and more preferably about 12 to 45 parts by weight (for example, about 15 to 40 parts by weight). In the case of too low a proportion of the metal salt, there is a possibility that improvement in flame retardancy is insufficient. In the case of too high a proportion, there is a possibility that enough mechanical properties cannot be obtained.

(D) Epoxy Compound

The epoxy compound (D) may include a polyepoxy compound (or a polyfunctional epoxy compound), for example, (d-1) an epoxy resin and (d-2) a vinyl-series copolymer having a glycidyl group. The epoxy compounds may be used singly or in combination.

(d-1) Epoxy Resin

The epoxy resin (d-1) may include, for example, a glycidyl ether-based epoxy resin, a glycidyl ester-based epoxy resin (e.g., diglycidyl phthalate, diglycidyl tetrahydrophthalate, diglycidyl hexahydrophthalate, dimethylglycidyl phthalate, dimethylglycidyl hexahydrophthalate, a glycidyl ester of dimer acid, an aromatic diglycidyl ester, and a cycloaliphatic diglycidyl ester), a glycidyl amine-based epoxy resin (e.g., tetraglycidyl diaminodiphenylmethane, triglycidyl-para-aminophenol, triglycidyl-meta-aminophenol, diglycidyl toluidine, tetraglycidyl meta-xylylenediamine, diglycidyl tribromoaniline, and tetraglycidyl bisaminomethylcyclohexane), a heterocyclic epoxy resin (e.g., triglycidyl isocyanurate (TGIC) and a hydantoin-based epoxy resin), a cyclic aliphatic epoxy resin (e.g., vinylcyclohexene dioxide, dicyclopentadiene oxide, an alicyclic diepoxyacetal, an alicyclic diepoxy adipate, and an alicyclic diepoxycarboxylate), and an epoxidized polybutadiene.

The glycidyl ether-based epoxy resin may include a glycidyl ether of a polyhydroxy compound [for example, a glycidyl ether of an aromatic polyhydroxy compound such as a bisphenol-based epoxy resin (e.g., a bisphenol A-based, a bisphenol AD-based, or a bisphenol F-based epoxy resin) or a resorcin-based epoxy resin; and an aliphatic epoxy resin (e.g., a glycidyl ether of an alkylene glycol or a glycidyl ether of a polyoxyalkylene glycol)], a novolak epoxy resin (e.g., a phenol novolak epoxy resin and a cresol novolak epoxy resin), and others.

Among these epoxy resins (d-1), the preferred one includes an aromatic epoxy resin (e.g. a bisphenol-based epoxy resin, a resorcin-based epoxy resin, and a novolak epoxy resin) and a cyclic aliphatic epoxy resin. Among others, a glycidyl ether-based aromatic epoxy resin, e.g., a bisphenol-based epoxy resin and a novolak epoxy resin, is preferred.

The epoxy equivalent of the epoxy resin may be, for example, about 250 to 1200 g/eq, preferably about 300 to 1100 g/eq, and more preferably about 400 to 1000 g/eq.

The number average molecular weight of the epoxy resin (d-1) may be, for example, about 200 to 50,000, preferably about 300 to 10,000, and more preferably about 400 to 6,000.

(d-2) Vinyl-Series Copolymer having Glycidyl Group

The vinyl-series copolymer (d-2) having a glycidyl group comprises a copolymer of a polymerizable monomer having a glycidyl group (e.g., a vinyl-series monomer having a glycidyl group) and other copolymerizable monomer.

The polymerizable monomer having a glycidyl group has at least one polymerizable group (for example, an ethylenic unsaturated bond (e.g., a vinyl group) and an acetylene bond) in addition to a glycidyl group. Such a monomer may include a glycidyl ether such as allyl glycidyl ether, vinyl glycidyl ether, chalcone glycidyl ether, or 2-cyclohexene-1-glycidyl ether; a glycidyl or epoxy ester such as glycidyl(meth)acrylate, glycidylmaleate, glycidyl itaconate, glycidyl vinylbenzoate, glycidyl allylbenzoate, glycidyl cinnamate, glycidyl cinnamylideneacetate, a glycidyl ester of dimer acid, an ester of an epoxidized stearyl alcohol and acrylic acid or methacrylic acid, or an alicyclic glycidyl ester (e.g., cyclohexene-4,5-diglycidyl carboxylate) (particularly, a glycidyl ester of an α,β-unsaturated carboxylic acid); an epoxydized unsaturated chain or cyclic olefin such as epoxyhexene or limonene oxide; N-[4-(2,3-epoxypropoxy)-3,5-dimethylbenzyl]acrylamide; and others. Among these monomers, the preferred one includes a vinyl-series monomer having a glycidyl group, for example, a glycidyl ester of an α,β-unsaturated carboxylic acid. These glycidyl group-containing polymerizable monomers may be used singly or in combination.

The glycidyl ester of the α,β-unsaturated carboxylic acid may include, for example, a glycidyl group-containing vinyl-series monomer represented by the following formula (3).

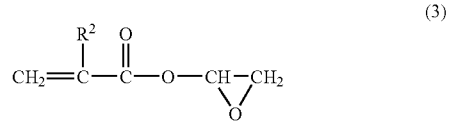

In the formula, $R^2$ represents a hydrogen atom or an alkyl group that may have a glycidyl ester group as a substituent.

In the formula (3), the alkyl group represented by $R^2$ may include a lower alkyl group such as methyl, ethyl, propyl, isopropyl, or butyl group (for example, a $C_{1-6}$alkyl group), and others. In the alkyl group having a glycidyl ester group as a substituent, the number of glycidyl ester groups is not particularly limited to a specific one, and for example, may be about 1 to 3 and usually about 1 or 2.

As the glycidyl ester of the α,β-unsaturated carboxylic acid, glycidyl(meth)acrylate is preferred.

The above-mentioned other copolymerizable monomer that is copolymerizable with the polymerizable monomer having a glycidyl group may include an olefinic monomer (e.g., an α-olefin such as ethylene, propylene, butene, or hexene), a diene-series monomer (e.g., a conjugated diene such as butadiene or isoprene), an aromatic vinyl-series monomer (e.g., a styrenic monomer such as styrene, α-methylstyrene, or vinyltoluene), an acrylic monomer (e.g., an alkyl(meth)acrylate such as (meth)acrylic acid or methyl methacrylate and acrylonitrile), a vinyl ester (e.g., vinyl acetate and vinyl propionate), a vinyl ether, and others. The copolymerizable monomer preferably includes a monomer having an α,β-unsaturated double bond. These copolymerizable monomers may be used singly or in combination. Among the copolymerizable monomers, the preferred one includes an olefinic monomer, an acrylic monomer (e.g., (meth)acrylic acid and an ester of (meth)acrylic acid), and others.

In the copolymer (d-2) having a glycidyl group, the proportion of the polymerizable monomer having a glycidyl group may be about 1 to 50% by weight, preferably about 2 to 40% by weight, and more preferably about 2 to 30% by weight. Incidentally, in the use of a monomer having a relatively lower polymerizability (for example, a vinyl ether, a vinyl ester, an ester of (meth)acrylic acid, acrylonitrile, and a styrenic monomer) as the copolymerizable monomer, the proportion of the polymerizable monomer having a glycidyl group may be reduced (for example, the proportion may be about 1 to 40% by weight).

The copolymer (d-1) having a glycidyl group preferably includes a copolymer obtained by at least using an olefinic monomer (e.g., a $C_{2-4}$olefin such as ethylene) as the above-mentioned copolymerizable monomer. If necessary, a (meth)acrylic monomer (e.g., a $C_{1-4}$alkyl (meth)acrylate) may be used in combination. Concrete examples of the copolymer include a $C_{2-4}$olefin-glycidyl (meth)acrylate copolymer such as an ethylene-glycidyl methacrylate copolymer; a $C_{2-4}$olefin-$C_{1-4}$alkyl (meth)acrylate-glycidyl(meth)acrylate copolymer such as an ethylene-methyl acrylate-glycidyl methacrylate copolymer, an ethylene-ethyl acrylate-glycidyl methacrylate copolymer, an ethylene-methyl methacrylate-glycidyl methacrylate copolymer, or an ethylene-ethyl methacrylate-glycidyl methacrylate copolymer; and others.

These epoxy compounds (D) may be used singly or in combination.

(Proportion of Each Component)

The proportion of the thermoplastic polyester elastomer (B) relative to 100 parts by weight of the polybutylene terephthalate-series resin (A) may be, for example, about 25 to 150 parts by weight, preferably about 50 to 140 parts by weight, and more preferably about 80 to 130 parts by weight. In the case of too low a proportion of the component (B) there is a possibility that the resin composition has a poor flexibility and is cracked due to flexion. In the case of too high a proportion of the component (B), heat resistance or hydrolysis resistance and burning resistance of the resin composition are remarkably deteriorated, and as a result, there is a possibility that the effect of the polybutylene terephthalate cannot be enough obtained.

The proportion of the phosphinic acid compound (C) relative to 100 parts by weight of the polybutylene terephthalate-series resin (A) may be, for example, about 5 to 40 parts by weight, preferably about 10 to 35 parts by weight, and more preferably about 10 to 30 parts by weight. In the case of too low a proportion of the component (C), there is a possibility that the improvement in flame retardancy is insufficient. In the case of too high a proportion of the component (C), flexibility or hydrolysis resistance of the resin composition is remarkably deteriorated, and as a result, there is a possibility that the effect of the polybutylene terephthalate cannot be enough obtained.

The proportion of the epoxy compound (D) relative to 100 parts by weight of the polybutylene terephthalate-series resin (A) may be, for example, about 0.5 to 20 parts by weight, preferably about 0.5 to 15 parts by weight, and more preferably about 0.8 to 12 parts by weight. In the case of too low a proportion of the component (D), there is a possibility that a melt tension of the resin necessary for processing is insufficient. In the case of too high a proportion of the component (D), there is a possibility that some problems (e.g., an increase in the viscosity of the resin) arise, from the viewpoint of molding.

For example, a representative mode is as follows: in the flame-retardant resin composition, the polybutylene terephthalate-series resin (A) may have an intrinsic viscosity of about 0.8 to 1.3 dL/g, the polyester elastomer (B) may be a block copolymer of (b-1) a polybutylene terephthalate hard block and (b-2) a polyester soft block having at least one unit selected from the group consisting of a polyether unit and an aliphatic polyester unit, and the epoxy compound (D) may be at least one member selected from the group consisting of (d-1) an aromatic epoxy resin having an epoxy equivalent of about 250 to 1200 g/eq and (d-2) a copolymer of a vinyl-series monomer having a glycidyl group and a copolymerizable monomer having an $\alpha,\beta$-unsaturated bond.

To the resin composition may be added a conventional additive, for example, a stabilizer (e.g., an antioxidant, an ultraviolet ray absorbing agent, a light stabilizer, and a heat stabilizer), an antistatic agent, a lubricant, a mold-release agent (or a releasing agent), other flame retardant, a flame-retardant auxiliary (or a flame-retardant synergist), a nucleating agent, a coloring agent (e.g., a dye or a pigment), a plasticizer, a filler, and a dripping inhibitor.

The total amount of the additive relative to 100 parts by weight of the polybutylene terephthalate-series resin (A) may be, for example, about 0.01 to 50 parts by weight, preferably about 0.1 to 40 parts by weight, and more preferably about 0.2 to 35 parts by weight (e.g., about 0.5 to 30 parts by weight).

To the resin composition of the present invention may be added other resin component as long as the effects of the present invention are not inhibited. Such a resin component may include, for example, a thermoplastic resin such as an acrylic resin, a fluorine-containing resin, a polyamide-series resin, a polyacetal-series resin, a polysulfone-series resin, a polyphenylene oxide-series resin, or a styrenic resin (e.g. f a polystyrene, an AS resin, and an ABS resin); a soft thermoplastic resin such as an ethylene-ethyl acrylate copolymer or an ethylene-vinyl acetate copolymer; and a thermosetting resin such as a phenol resin, a melamine resin, a polyester resin (e.g., an unsaturated polyester), a silicone resin, or an epoxy resin. These other resins may be used singly or in combination.

The resin composition of the present invention may be a particulate mixture or a molten mixture or may be a molded product obtained by solidifying the molten mixture (e.g., a sheet- or film-like composition). The particulate mixture may be prepared by mixing the PBT-series resin (A), the thermoplastic polyester elastomer (B), the phosphinic acid compound (C), and the epoxy compound (D), and if necessary, an additive and/or other resin component through a conventional manner. For example, the following processes may be adopted: (1) a process comprising mixing each component, kneading and extruding the resulting mixture into pellets with a single screw or twin screw extruder, and molding a product from the pellets, (2) a process comprising once making pellets (master batches) different in formulation, mixing (diluting) the pellets in a certain ratio, and molding a product having a certain formulation from the resulting pellets, (3) a process comprising directly feeding one or not less than two of each component in a molding machine, and others. Incidentally, in the preparation of the composition to be used for the molded product, mixing and melt-kneading of a particulate of the resin component (e.g., the component (A) (B), or (D), and the above-mentioned other resin) and other component(s) are advantageous to increase dispersion of other component(s).

The resin composition of the present invention may be melt-kneaded to mold a molded product with the use of a conventional manner such as an extrusion molding, an injection molding, or a compression molding. The resin composition is excellent in flame retardancy and molding workability and can be utilized for production of various molded products. In addition, the resin composition can be preferably used for various purposes, for example, an electric or electronic device part, a mechanical device part, an automotive part, a packaging material, and a case.

In particular, since the resin composition of the present invention is excellent in such properties as burning resistance, heat resistance, hydrolysis resistance, and flexibility, the resin composition is useful for covering (or coating) an electric wire (including, for example, a conducting wire such as a copper wire or a platinum wire and a power-transmission wire or a transmission (wave-transmission) wire such as an optical fiber cable), and others. In particular, the resin composition is excellent in hydrolysis resistance and flexibility in addition to burning resistance, heat resistance, and others. Further, the resin composition can have suitable adhesiveness to an electric wire. Therefore, the resin composition is useful for purpose of covering (or coating) an electric wire (e.g., useful as a flame-retardant resin composition for covering an electric wire).

By covering (or coating) an electric wire with the resin composition, a covered electric wire can be produced. The process for covering (or coating) the electric wire is not particularly limited to a specific one, and may include a conventional covering (or coating) process, for example, a process for covering an electric wire with the use of an extrusion molding or a press processing. For example, if necessary, the covered electric wire may be produced by press processing an electric wire with holding the wire between the sheet- or film-like resin compositions.

Moreover, the present invention also discloses an electric wire covered (or coated) with the resin composition (including a power-transmission wire or a transmission (wave-transmission) wire such as an optical fiber cable).

According to the resin composition of the present invention, a combination of four specific components provides a resin composition having a high flame retardancy and being excellent in workability and flexibility or toughness. Moreover, the resin composition can have suitable adhesiveness to a conductor (an electric wire), and is excellent in durability (e.g., hydrolysis resistance), heat resistance, and extrusion workability. Therefore, the resin composition is useful for a purpose for covering an electric wire. Further, the resin composition inhibits bleeding out even under a high-temperature environment and can maintain excellent properties.

The resin composition of the present invention or the molded product of the composition are suitable for, e.g., such a purpose as an electric or electronic device part, a mechanical device part, an automotive parts, a packaging material or a case. In particular, the resin composition of the present invention is excellent in properties such as burning resistance, heat resistance, hydrolysis resistance and flexibility and can have suitable adhesiveness to an electric wire. Therefore, the resin composition is particularly useful for covering an electric wire (including a power-transmission wire or a transmission (wave-transmission) wire such as an optical fiber cable).

EXAMPLES

The following examples are intended to describe this invention in further detail and should by no means be interpreted as defining the scope of the invention. Incidentally, measuring methods of characteristic evaluations in the following examples are shown as follows.

[Tensile Strength and Strain at Break]

Resin compositions obtained in Examples and Comparative Examples were formed into films of 0.2 mm in thickness by an extrusion molding, respectively. In accordance with JIS (Japanese Industrial Standards) S-Z1707, a dumbbell specimen was punched out of the film and placed under an environment of 23° C. and 50% RH to measure a tensile strength and a strain at break (%) at a tensile rate of 100 mm/minute.

[Hydrolysis Resistance (Tensile Strength and Strain at Break After Heat and Humidity Test)]

Resin compositions obtained in Examples and Comparative Examples were formed into films of 0.2 mm in thickness by an extrusion molding, respectively. In accordance with JIS S-Z1707, a dumbbell specimen was punched out of the film and placed in a pressure cooker testing machine at 121° C./2 atmospheres for 48 hours, and thereafter a tensile strength and a strain at break (%) were measured at tensile rate of 100 mm/minute to evaluate hydrolysis resistance.

[Melt Tension]

Each melt tension of the resin compositions was measured at a temperature of 260° C. by using a capirograph (orifice diameter: 1.0 mm, orifice length: 20.0 mm, barrel diameter: 9.55 mm) manufactured by Toyo Seiki Seisaku-sho, Ltd.

[Extrusion Workability]

In Examples and Comparative Examples, a copper wire having a diameter of 0.9 mm was covered (or extrusion-molded) with each resin composition and the extrusion state was visually evaluated on the basis of the following two criteria. Incidentally, no bleeding out was observed in the obtained extrusion-molded products.

"A": The wire is uniformly covered (or coated) with the resin composition.

"B": The wire is uniformly covered (or coated) with the resin composition and naked in places.

[Flammability]

Each covered (or coated) electric wire produced for the above-mentioned extrusion workability evaluation was subjected to a 45° inclination flame test in accordance with ISO 6722-12 to evaluate a flammability of each resin composition.

[Strip Force Test]

Each covered electric wire produced for the above-mentioned extrusion workability evaluation was subjected to a peeling test of a covering resin in accordance with ISO 6722-7.2 to evaluate a strip force of each resin composition.

Examples 1 to 7 and Comparative Examples 1 to 3

Each component shown in Table 1 and Table 2 was dry-blended in each proportion shown in the Tables and melt-kneaded into pellets at 260° C. with a twin screw extruder having a screw of 30 mm in diameter to give a pellet resin composition.

The obtained pellet composition was dried at 140° C. for 3 hours and then melt-kneaded at 260° C. with a plastmill single screw extruder having a screw of 20 mm in diameter. A copper wire having 0.9 mm in diameter was covered with the kneaded matter at a covering (or coating) thickness of 0.2 mm.

The results of Examples and Comparative Examples are shown in Tables 1 and 2. Incidentally, in Examples and Comparative Examples, the following components were used.

(A) PBT-series resin
(A-1) Polybutylene terephthalate (melt viscosity IV=0.88 dL/g, manufactured by Win Tech Polymer Ltd.)
(A-2) Polybutylene terephthalate (melt viscosity IV=1.20 dL/g, manufactured by Win Tech Polymer Ltd.)
(B) Thermoplastic polyester elastomer
(B-1) "PELPRENE GP300" manufactured by Toyobo Co., Ltd.
(B-2) "PLACCEL BL6503" manufactured by Daicel Chemical Industries, Ltd.
(B-3) "NUBELAN P4110AN" manufactured by Teij in Chemicals Ltd.
(C) Phosphinic acid compound
(C-1) Aluminum salt of 1,2-diethylphosphinic acid prepared by the following process 1,2-Diethylphosphinic acid (2106 g (19.5 mol)) was dissolved in 6.5 L of water. To the solution was added 507 g (6.5 mol) of aluminum hydroxide with stirring violently, and the resulting mixture was heated to 85° C. The mixture was stirred between at 80 and 90° C. for 65 hours in total. Thereafter, the mixture was cooled to 60° C. and subjected to a filtration under reduced pressure. The residue was dried in a vacuum drying cabinet at 120° C. until the weight became constant. A fine-particle powder (2140 g) that did not melt at a temperature of not higher than 300° C. was obtained. The yield was 95% of the theoretical estimate.

(C-2) Calcium salt of 1,3-ethane-1,2-bismethylphosphinic acid

Ethane-1,2-bismethylphosphinic acid (325.5 g (1.75 mol)) was dissolved in 500 ml of water. To the solution was added 129.5 g (1.75 mol) of calcium hydroxide in several stages over one hour with stirring violently. Next, the mixture was stirred between at 90 and 95° C. for several hours, cooled, and subjected to a filtration under reduced pressure. The residue was dried in a vacuum drying cabinet at 150° C. to give a product (335 g). The product was not melted at a temperature of not higher than 380° C. The yield was 85% of the theoretical estimate.

(D) Epoxy compound
- (D-1) "LOTADER AX8930" manufactured by Atofina Japan, Co. Ltd.
- (D-2) "BOND FAST BF7M" manufactured by Sumitomo Chemical Co., Ltd.
- (D-3) "EPIKOTE 1004" manufactured by Yuka Shell Epoxy K.K.

TABLE 1

| | | Examples | | | | | | |
|---|---|---|---|---|---|---|---|---|
| | | 1 | 2 | 3 | 4 | 5 | 6 | 7 |
| PBT-series resin (parts by weight) | A-1 | 100 | 100 | 100 | 100 | 100 | 100 | |
| | A-2 | | | | | | | 100 |
| Thermoplastic polyester elastomer (parts by weight) | B-1 | 100 | | | 100 | 100 | 100 | |
| | B-2 | | 100 | | | | | 100 |
| | B-3 | | | 100 | | | | |
| Phosphinic acid compound (parts by weight) | C-1 | 20 | 20 | | | 10 | 30 | |
| | C-2 | | | 20 | 20 | | | 20 |
| Epoxy compound (parts by weight) | D-1 | 10 | | 12 | | 10 | | |
| | D-2 | | 12 | | | | 10 | 5 |
| | D-3 | | | | 1 | | | |
| Tensile strength (MPa) | Under non-heat and non-humidity | 17 | 15 | 16 | 16 | 18 | 15 | 16 |
| | Under heat and humidity | 22 | 20 | 21 | 21 | 22 | 21 | 21 |
| Strain at break (%) | Under non-heat and non-humidity | >400 | >400 | >400 | >400 | >400 | >400 | >400 |
| | Under heat and humidity | 210 | 230 | 260 | 220 | 260 | 200 | 240 |
| Melt tension | | 4.0 | 3.6 | 3.4 | 3.2 | 3.9 | 4.1 | 3.2 |
| Extrusion workability | | A | A | A | A | A | A | A |
| Flammability (second) | | 24 | 16 | 18 | 36 | 60 | 3 | 18 |
| Peeling strength of electric wire (N) | | 44.1 | 43.1 | 47.0 | 41.2 | 46.1 | 42.1 | 46.1 |

TABLE 2

| | | Comparative Examples | | |
|---|---|---|---|---|
| | | 1 | 2 | 3 |
| PBT-series resin (parts by weight) | A-1 | 100 | 100 | 100 |
| | A-2 | | | |
| Thermoplastic polyester elastomer (parts by weight) | B-1 | | | 100 |
| | B-2 | | 100 | |
| | B-3 | | | |
| Phosphinic acid compound (parts by weight) | C-1 | 20 | | 20 |
| | C-2 | | | |
| Epoxy compound (parts by weight) | D-1 | 10 | | |
| | D-2 | | 10 | |
| | D-3 | | | |
| Tensile strength (MPa) | Under non-heat and non-humidity | 32 | 18 | 16 |
| | Under heat and humidity | 36 | 25 | 21 |
| Strain at break (%) | Under non-heat and non-humidity | 200 | >400 | >400 |
| | Under heat and humidity | 10 | 300 | 200 |
| Melt tension | | 1.8 | 4.0 | 1.1 |
| Extrusion workability | | B | A | B |
| Flammability (second) | | 5 | >100 | 80 |
| Peeling strength of electric wire (N) | | 41.2 | 78.4 | 40.2 |

What is claimed is:

1. A flame-retardant resin composition, comprising (A) a polybutylene terephthalate-series resin, (B) a thermoplastic polyester elastomer, (C) a phosphinic acid compound comprising a salt of at least one member selected from the group consisting of a phosphinic acid, a diphosphinic acid, and a polymerized product thereof, and (D) an epoxy compound.

2. A resin composition according to claim 1, wherein the polyester elastomer (B) comprises a block copolymer of (b-1) a polyalkylene arylate hard block and (b-2) a polyester soft block.

3. A resin composition according to claim 1, wherein, regarding the phosphinic acid compound (C), the salt of a phosphinic acid is represented by the following formula (1), and the salt of a diphosphinic acid is represented by the following formula (2):

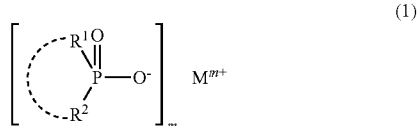

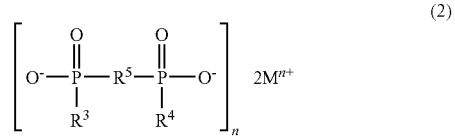

wherein $R^1$, $R^2$, $R^3$, and $R^4$ are the same or different and each represents an alkyl group, a cycloalkyl group, an aryl group, or an aralkyl group, and $R^5$ represents an alkylene group, an alicyclic bivalent group, or an aromatic bivalent group; $R^1$ and $R^2$ may bond together to form a ring with an adjacent phosphorus atom; $M^{m+}$ represents a metal having m-valences, and "m" denotes an integer of 2 to 4; $M^{n+}$ represents a metal having n-valences, and "n" denotes an integer of 2 to 4.

4. A resin composition according to claim 1, wherein the salt of a phosphinic acid and the salt of a diphosphinic acid are metal salts, and the metal constituting the metal salts is an alkaline earth metal or a metal of the group 13 of the Periodic Table of Elements.

5. A resin composition according to claim 1, wherein the epoxy compound (D) comprises at least one member selected from the group consisting of (d-1) an epoxy resin and (d-2) a vinyl-series copolymer having a glycidyl group.

6. A resin composition according to claim 1, which comprises 25 to 150 parts by weight of the polyester elastomer (B), 5 to 40 parts by weight of the phosphinic acid compound (C), and 0.5 to 20 parts by weight of the epoxy compound (D), relative to 100 parts by weight of the polybutylene terephthalate-series resin (A).

7. A resin composition according to claim 1, wherein the polybutylene terephthalate-series resin (A) has an intrinsic viscosity of 0.8 to 13 dL/g, the polyester elastomer (B) comprises a block copolymer of (b-1) a polybutylene terephthalate hard block and (b-2) a polyester soft block having at least one unit selected from the group consisting of a polyether unit and an aliphatic polyester unit, and the epoxy compound (D) comprises at least one member selected from the group consisting of (d-1) an aromatic epoxy resin having an epoxy equivalent of 250 to 1200 g/eq and (d-2) a copolymer of a vinyl-series monomer having a glycidyl group and a copolymerizable monomer having an $\alpha,\beta$-unsaturated bond.

8. A covered or coated electric wire, which comprises an electric wire whose surface is covered or coated with a flame-retardant resin composition recited in claim 1.

9. A process for covering or coating an electric wire, which comprises covering or coating a surface of an electric wire with a flame-retardant resin composition recited in claim 1.

10. A process according to claim 9, wherein the surface of an electric wire is covered or coated with the use of an extrusion molding or a press processing.

\* \* \* \* \*